(12) United States Patent
Brandsma et al.

(10) Patent No.: US 6,464,606 B2
(45) Date of Patent: Oct. 15, 2002

(54) DRIVE BELT FOR A CONTINUOUSLY VARIABLE TRANSMISSION, CONTINUOUS BAND THEREOF AND METHOD OF PRODUCING SUCH A CONTINUOUS BAND

(75) Inventors: Arjen Brandsma, Tilburg; Johannes Hendrikus Van Lith, Berlicum; Cornelis Johannes Maria Van Der Meer, Tilburg; Cornelus Hendricus Maria Van Oirshot, Tilburg; Johannes Haaije Van Der Kamp, Tilburg; Gerardus Petrus Maria Van Dijnsen, Eindhoven, all of (NL)

(73) Assignee: Van Doorne's Transmissie B.V., Tilburg (NL)

( * ) Notice: Subject to any disclaimer, the term of this patent is extended or adjusted under 35 U.S.C. 154(b) by 0 days.

(21) Appl. No.: 09/736,249

(22) Filed: Dec. 15, 2000

(65) Prior Publication Data
US 2001/0004616 A1 Jun. 21, 2001

(30) Foreign Application Priority Data
Dec. 20, 1999 (EP) .............................................. 99204419

(51) Int. Cl.[7] .............................. F16G 1/21; F16G 5/16; F16H 55/56; F16H 9/12; B21D 53/14
(52) U.S. Cl. ....................................... 474/242; 474/237
(58) Field of Search ................................ 474/242, 240, 474/237, 201, 244

(56) References Cited

U.S. PATENT DOCUMENTS

| 4,080,841 A | * | 3/1978 | Vollers | |
| 4,498,892 A | * | 2/1985 | Huntley | 474/242 |
| 4,579,549 A | * | 4/1986 | Okawa et al. | 474/242 |
| 4,619,634 A | * | 10/1986 | Nakawaki | 474/201 |
| 4,643,702 A | * | 2/1987 | Cuypers | 474/242 |
| 4,824,424 A | * | 4/1989 | Ide et al. | 474/242 |
| 6,123,637 A | * | 9/2000 | Yagasaki | 474/242 |
| 6,217,471 B1 | * | 4/2001 | Brandsma et al. | 474/242 |
| 2001/0004616 A1 | * | 6/2001 | Brandsma et al. | 474/242 |

FOREIGN PATENT DOCUMENTS

| DE | 26 43 528 | | 4/1977 |
| EP | 0305023 | * | 3/1989 |
| EP | 0 950 830 | | 10/1999 |
| EP | 1085235 | * | 3/2001 |
| JP | 58030549 | | 2/1983 |
| JP | 61160645 | | 7/1986 |
| JP | 03229038 | | 10/1991 |
| JP | 214956 | * | 8/2001 |

* cited by examiner

Primary Examiner—Douglas C. Butler
(74) Attorney, Agent, or Firm—Young & Thompson

(57) ABSTRACT

A drive belt for a transmission realizing a continuously adjustable transmission ratio comprising at least one continuous band having a part, which, when in a longitudinally stretched state, shows a curvature in a direction transverse to the longitudinal direction of the drive belt (1), said curvature being of a generally arc-like shape having a stretched band radius $R_{SB}$, associated with a number of cross elements, each having a contact face for interacting with a principal face of the continuous band and provided with a transverse convex curvature of a generally arc-like shape having a face radius $R_S$. The inverse value of the face radius $R_S$ minus the inverse value ($1/R_{SB}$) of the stretched band radius $R_{SB}$ is notionally larger than $-5\ m^{-1}$, preferably larger than $-3.5\ m^{-1}$.

14 Claims, 3 Drawing Sheets cross section A-A cross section B-B cross section C-C cross section D-D cross section A-A cross section B-B cross section C-C cross section D-D

DRIVE BELT FOR A CONTINUOUSLY VARIABLE TRANSMISSION, CONTINUOUS BAND THEREOF AND METHOD OF PRODUCING SUCH A CONTINUOUS BAND

BACKGROUND OF THE INVENTION

This present invention relates to a drive belt for a transmission realizing a continuously variable transmission ratio. The invention further relates to a continuous band for such a drive belt and to a method for producing such a continuous band.

DESCRIPTION OF THE RELATED ART

Drive belts of the present type are generally known through their application in continuously variable transmissions. Currently applied and tested continuous bands have a transverse width ranging from 8 to 35 millimeters, a radial thickness ranging from of 0.10 to 0.30 millimeters and a longitudinal length ranging from 200 to 700 millimeters. These ranges typify the automotive application of the drive belt. The known drive belts are adopted in continuously variable transmissions, where the drive belt runs between the conical sheaves of a pair of adjustable pulleys, whereby the pulley sheaves exert a clamping force on the cross elements. The clamping force on the one hand enables torque transmission through friction between pulleys and drive belt and on the other hand urges the cross elements radially outward with respect to the rotational axle of the pulley. The actual radial movement of the cross elements is limited by the continuous band, so that the clamping force is transmitted by the cross elements to the continuous band via a normal force between the elements and the continuous band. The continuous band is thereby put under tension enabling torque transfer by the cross elements pushing each other from one pulley to the other without buckling of the drive belt. The transmission ratio of the continuously variable transmission is determined by the ratio of the running radii of the drive belt in the pulleys and can be varied from a maximum transmission ratio, wherein the running radius of the drive belt in a first pulley is maximal and that in a second pulley is minimal, via a medium transmission ratio, wherein both said running radii are virtually equal, to a minimum ratio, wherein the running radius in a first pulley is minimal and that in a second pulley is maximal.

Usually, at least the continuous band or bands are of metal to reliably cope with high torque levels that occur in automotive applications. Usually also the separate cross elements of the drive belt are of metal and are dimensioned essentially conforming. Because of its nature of use in continuously variable transmissions, the known drive belt is during operation subjected to extremely high bending and tensile stresses varying in height with the amount of bending in its longitudinal direction and with the torque transmitted by the transmission or the tension in the continuous band resulting therefrom. For this reason avoidance of breakage of a drive belt during the service life of the transmission or the vehicle wherein it is to be applied, e.g. because of fatiguing and/or wear, is a main point of consideration. In the German patent DE-A-2.643.528 it was recognized that abrasive contact between a lateral side of the continuous band and the pulleys or the cross elements, more in particular a neck part of said elements, results in excessive wear and early breakage of the continuous band. To avoid the said contact, a drive belt comprising a continuous band, preferably provided in a set of radially nested continuous bands and a number of cross elements each having a contact face, which is also known as a saddle, intended for interaction with the continuous band and provided with a convex curvature in direction transverse to the longitudinal direction of the belt is disclosed. This transverse curvature of the contact face of the cross elements is intended to obtain a tracking effect, through which the mutual orientation of continuous band and cross elements is promoted and abrasive contact between a side face of the continuous band and the cross elements is avoided.

It appeared in practice that even in cases where the drive belt was constructed according to the know art with a continuous band having a smooth, flat and essentially continuous surface, the problem of additional wear of the continuous band and sometimes of early failure of the belt with respect to what was to be expected could still be observed. Analysis of this problem revealed that it was, at least in some cases, caused by a fatigue crack originating from near the lateral sides of the continuous band. This implied that during operation relatively high Hertze stresses near the lateral sides of the continuous band can still occur, whereby the load is carried to a significant extent by the lateral sides of the continuous band.

SUMMARY OF THE INVENTION

The present invention aims at providing a solution for raising drive belt service life, by preventing said relatively high Hertze stresses near the lateral sides of the continuous band. More in particular, the invention aims at lowering the stress levels occurring during operation in the continuous band, in particular near its lateral sides, by providing it with a suitable transverse curvature, while maintaining the known tracking effect.

The drive belt in accordance with the invention had a continuous band showing a curvature in a direction transverse to its longitudinal direction, which curvature is related to the transverse curvature of the contact face of the cross elements. A drive according to the invention has an improved service life and has continuous band which is shaped in relation to the cross elements of the drive belt such, that contact between band and elements is buildup without unduly high stresses, e.g. Hertze stresses, occurring near the lateral sides of the drive belt.

It is remarked that in the state of the art, such as represented EP-A-0.305.023, drawings are incorporated showing a continuous band having a curvature which is equal to that of the cross element contact face. However, the art does not indicate the circumstances represented in these drawing, e.g. it does not indicate the transmission configuration or the amount of loading of the drive belt. In the absence of such information, it is concluded that these drawings represent a drive belt during operation, where the normal force between continuous band and cross element elastically deforms the band such that it fits the contact face of the cross element. It is further remarked, that the continuous bands of commercially available drive belts of the present type may show a transverse curvature. The curvature known from such belts, however, appears to be irrespective of the curvature of the contact face of the drive belt cross elements and more in particular is not in accordance with the present invention. Therefore it is concluded that the said transverse curvature is a consequence of the manufacturing process of the continuous band.

The solution according to the invention reflects the underlying insight that a continuous band unavoidably shows a transverse curvature, possibly due to characteristics of the manufacturing process, but in any case due to the phenomenon of anti-clastic bending. According to the insight underlying the present invention, the continuous band in the known drive belt is not only subjected to stress due to bending in the longitudinal direction of the drive belt, but also to a significant extent to stresses due to bending in a plane extending transverse to the longitudinal direction of the drive belt, which is virtually in the axial direction. As will be elaborated below, the invention includes and is based on the condition that, when the normal force between cross element and continuous band is buildup to a significant extent, the transverse curvature of the band should be less than that of the contact face. This is particularly important since the analysis of the problem revealed that the said relatively high Hertze stresses near the lateral sides of a continuous band are not only caused by axial contact of continuous band and pulley or the cross element neck part, but also by the nature of the transverse curvature of the band. In particular and surprisingly the said relatively high Hertze stresses were found to be due to contact between the lateral sides of the band and the contact face. The load on the continuous band in accordance with the invention will be advantageously distributed and, in particular, will not show a concentration near the lateral sides of the band.

Anti-clastic bending of a flat continuous band is such that, next to the intended longitudinal bending, the band also bends in a plane transverse to its longitudinal direction, however, with an opposite orientation, i.e. if the band is longitudinally bent convex, i.e. radially inward, it will transversely bent in a concave manner, due to the phenomenon of anti-clastic bending, and vice versa. If the continuous band is provided with an initial amount of transverse curvature, this will influence the transverse shape of the band when longitudinally bent. For example, it might be departed from a continuous band having a rectangular transverse cross section in an unloaded state, i.e. the state wherein band is not subjected to external forces that are large enough to notionally deform it. The latter is usually the case, when the continuous band is positioned in a generally arc-like shape resting with a side face on a smooth and horizontal surface with its principle faces extending essentially perpendicular to the said surface. Departing from such a flat continuous band in said unloaded state, the transverse curvature of the band varies alternately between a radially convex shape when the band is stretched in longitudinal direction to a radially concave shape when the continuous band is longitudinally bent.

When used in the transmission the drive belt is shaped in a transmission configuration as opposed to a free configuration, such as a circle in the unloaded state, which is possible only when the drive belt is taken separate from the transmission. A transmission configuration of the drive belt always is made up of two longitudinally stretched parts where the drive belt is running from one pulley to the other and vice versa, two longitudinally bent parts where the drive belt is running between the sheaves of the two pulleys at an essentially constant running radius, which is smaller than that of the free circle configuration, and four transitional parts where the said stretched parts and said bent parts merge. In the said transitional parts the radius of curvature of the continuous band in the longitudinal direction smoothly changes from infinite, i.e. a stretched, to the actual running radius in the respective pulley and vice versa. As is well known in the art, the said normal force between cross elements and continuous band is build up, or off, between zero and a maximum level in said transitional parts in dependence on the radius of curvature in the longitudinal direction in such a manner that said normal force increases when said radius decreases. Concluding, it is thus found that as the said normal force increase the longitudinal bending of the drive belt increases and the amount of the axial curvature of the continuous band reduces, or even concave.

According to the invention, a drive belt has an improved load distribution over the axial width of a continuous band and will thus have an improved resistance to fatiguing and consequently a prolonged service life. More in particular, the transverse curvatuve of the continuous band is defined such, that contact between band and a cross elements exclusively at the lateral side of the band, is only allowed up to a relatively small normal force between continuous band and the respective cross element. The drive belt according to the invention has a continuous band which, when in a stretched condition, shows a transversely oriented curvature of generally arc-like shape having a radius $R_{SB}$, i.e. the stretched band radius, which is related to the radius $R_S$ of the convex curvature of the contact face, i.e. the face radius, according to the equation:

$$\frac{1}{R_F} - \frac{1}{R_{SB}} \geq C$$

wherein the value of the constant C is notionally larger than −5 per meter and preferably larger than −3.5 per meter. The numerical limitations of −5 and −3.5 per meter are related to the percentage of buildup of the normal force between continuous band and cross element that may be allowed. It was established that a buildup of the normal force of approximately 25% of its maximum level before the transverse curvature of the continuous band becomes equal to, or less than, that of the contact face of the cross element, may be allowed without substantial deterioration of service life. From this, the value −5 per meter is found for the constant C. It is, however, to be preferred if only approximately 10% of buildup is allowed, in which case a value of −3.5 per meter is found for the constant C.

Obviously, a value of zero for the constant C, i.e. a drive belt wherein the longitudinally stretched part of the continuous band shows a transverse curvature which is equal to, or less than, the convex curvature of the contact face of a cross element, entirely prevents the above discussed adverse loads on the continuous band from occurring and is as such the most preferable. However, the following should also be considered according to the invention.

Depending on the amount of longitudinal bending of the continuous band when the drive belt is the most tightly bent in its longitudinal direction, the transverse curvature of the band may become concave, due to anti-clastic bending. The continuous band will then be deformed considerably by the said normal force to fit the transversely curved contact face of the cross elements. Since during operation in this drive belt configuration, i.e. the most tightly bent, the normal force will generally be the highest, the accompanying stresses in the continuous band will be of a significant magnitude, again having an adverse effect on the drive belt service life. In accordance with an elaboration of the invention it is advantageous, when in this situation the transverse curvature of the band is either zero or convex, in order to restrict the amount of deformation of the band and the accompanying stress levels. The most preferable situation occurs, according to the invention, when in this situation the transverse curvature of the band is convex and equal to that of the contact face of the cross element. In this case, the radial deformation of the band and the accompanying forces will be zero when it is the most highly loaded by the normal force.

It is remarked, that what is described and claimed by the invention for the contact between a continuous band and a cross element contact face, also holds to a large extent for the contact between continuous bands mutually in a drive belt comprising two or more radially nested continuous bands.

The invention is further related to a continuous band for use in the drive belt according to the invention. Such continuous bands are generally manufactured from a continuous metal strip, at least by means of a plastic deformation method, such a rolling process and/or a pre-tensioning process. Both said processes are characterised by a continuous band geometry which is essentially uniform along its circumference, but which may be profiled in a direction transverse to the longitudinal direction of the continuous band.

The stretched band radius $R_{SB}$ of a continuous band according to the invention intended for use in a drive belt designs currently preferred for automotive application has a value in the range from 50 to 250 millimeters.

The invention is also related to a continuously variable transmission provided with the drive belt according to the invention. Such a transmission comprises a pair of pulleys between which torque may be transferred by means of a drive belt at a variable transmission ratio. To this end, each pulley is provided with two conical sheaves between which a part of the drive belt is located. The sheaves are capable of exerting a clamping force on side faces of the transversely oriented elements, so that torque may be transferred between pulley and drive belt by means of friction. During operation in a continuously variable transmission, the drive belt is the most tightly bent in its longitudinal direction, when it runs between the sheaves of a pulley at the smallest possible running radius.

To measure the relatively small axial curvature of the continuous band according to the invention without disturbing it, i.e. without applying forces to the continuous band thereby altering the said axial curvature, a surface curvature measuring means is to be adopted that is capable of remote sensing, such as known means employing a laser beam or other electromagnetic means. It is, however, considered more convenient to measure said curvature with a surface curvature measuring means that makes use of a mechanical contact with the continuous band, such as measuring means that senses the perpendicular movement of a feeler running over a surface to be measured. The invention also provides for a method for locally measuring the transverse curvature of a continuous band requiring only simple and readily available means. According to the invention, said method comprises the steps of:

mounting the continuous band over two cylindrical rollers preferably provided with a radial surface that is curved in the axial direction of the roller, moving said rollers apart to effect tension in said continuous band, selecting the a part of the continuous band in between said rollers, which part is stretched in the longitudinal direction of the continuous band, positioning a feeler in contact with and essentially perpendicular to either the inner principle face or the outer principle face of the continuous band, moving the feeler in the axial direction across the continuous band, determining the perpendicular movement of the feeler in dependence on its axial position, determining the best fit of a circle of radius $R_B$ to said perpendicular movement of the feeler in dependence on its axial position with the aid of a suitable method, such a mathematical fit or an optical selection by comparing the transverse curvature of the band with a number of arcs of varying radius.

With the method according to the invention, the amount of transverse curvature of the continuous band is measured in the longitudinally stretched state. The phenomenon of anti-clastic bending determines the correlation between the amount of curvature in the said longitudinally stretched state and in other states wherein the continuous band is more or less bent in the longitudinal direction. Therefore, the amount of curvature in the unloaded state may be approximated from the amount of curvature in the stretched state, for example using mathematical analysis of the phenomenon, an estimated multiplication factor, or empirical data. It is also feasible to adopt the above described method to measure the axial curvature of a part of the continuous band when it is bent in the longitudinal direction, e.g. by orienting parts of the continuous band at an angle other than 180 degrees and selecting the said part to be measured in between the so oriented parts.

The invention also provides for a method for producing a continuous band according to the invention. According to the invention, said method comprises the steps of:

deforming a continuous band, preferably by a rolling process, wherein the band is lead between the surfaces of two, preferably rotating, deformation elements, and/or by a pre-tensioning process, wherein the band is deformed by axially moving two, preferably rotating, rollers around which the band is positioned radially apart from each other, using deformation elements and/or rollers with suitably curved radial surface, such that at least a part of the band shows a curvature which corresponds to a curvature of the band defined in any of the preceding claims, annealing the band, thereafter heating the band, preferably in a nitrogen environment, for chemically creating a superficial permanent compression layer known per se.

According to the invention, the order of the steps of annealing and pre-tensioning may be changed depending on the desired material characteristics of the continuous band.

BRIEF DESCRIPTION OF THE DRAWINGS

The invention will now further be explained by way of examples given in the accompanying drawing wherein:

FIG. 1 is a schematic representation of the transmission, the drive belt and the continuous band the present invention relates to;

DESCRIPTION OF THE PREFERRED EMBODIMENTS

FIGS. 2 to 5 show the transverse curvature of the continuous band 20 in a plane transverse to its longitudinal direction in an exaggerated manner to more clearly illustrate the invention.

Figure 1:
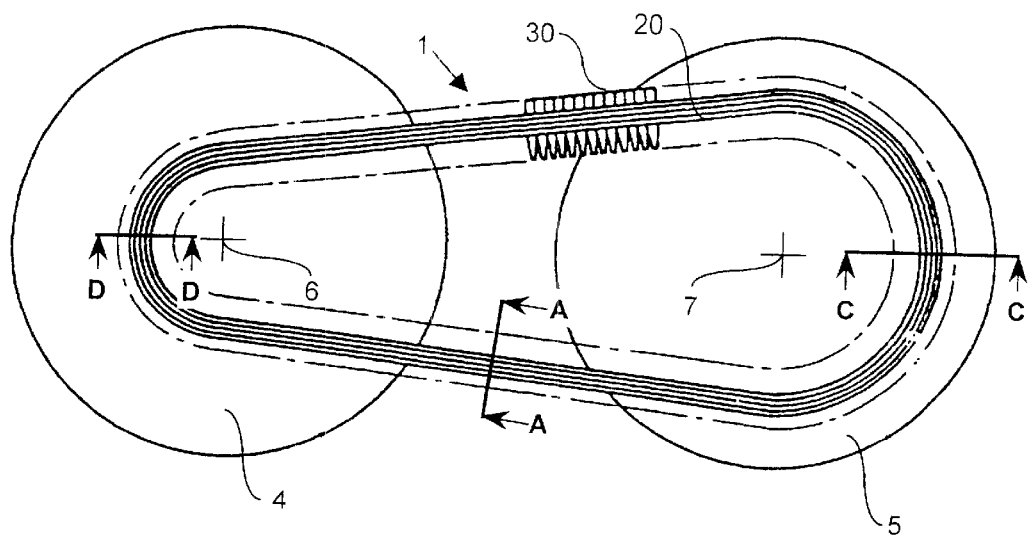
Figure 2A:
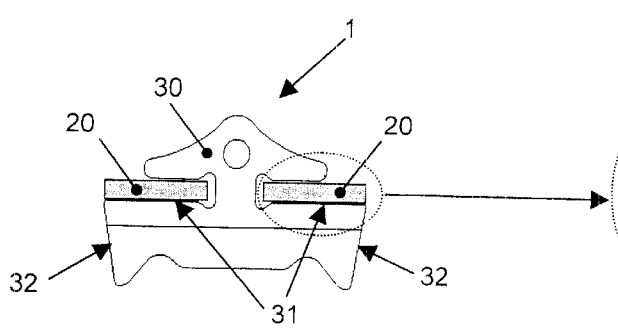
FIGS. 2A, 2B, 2C, 2D, 2E and 2F show several configurations.

FIG. 1 represents a schematic transverse cross section of a continuously variable transmission, or CVT, with a drive belt 1 which comprises a set of radially nested relatively thin continuous bands 20, which may be bent relatively easily in their longitudinal direction, and of a number of cross elements 30 having contact faces 31. The drive belt 1 runs between the sheaves of a pair of pulleys 4, 5 each having a rotational axle 6, 7 respectively. To enable torque transfer between the pulleys 4, 5, friction between the drive belt 1 and the sheaves of the pulleys 4, 5 is established by axially moving the sheaves of a pulley towards each other, thereby exerting a clamping force on the drive belt 1. To this end the cross elements 30 of the drive belt 1 are provided with side faces 32 that are mutually oriented at an angle, as shown in FIG. 2A. Because of the conical shape of the pulleys 4, 5 together with the slanted side faces 32, the cross elements 30 are urged radially outward thereby exerting a normal force $F_{E-B}$ on the continuous band 20 that is put under tension as a consequence. Thus torque transfer between the pulleys 4, 5 by means of the elements 30 mutually exerting a push force on each other is enabled without the occurrence of drive belt 1 buckling, due to the tension in the continuous band 20. The radii at which the drive belt 1 runs between the sheaves of the respective pulley 4 or 5 is steplessly variable, so that a continuously variable torque transmission ratio may be achieved between said pulleys 4, 5. During operation of the CVT the cross elements 30 may slide along the continuous bands 20, while they are in contact with the radially inner surface 24 of band 20 via their contact faces 31. Such a continuously variable transmission is known per se. A cross section of a longitudinally stretched part of the continuous band 20 is denoted A—A. Cross section C—C intersects the band 20 at a longitudinally bent part and, finally, cross section D—D intersects the band 20 at a part which is the most tightly bent in longitudinal direction.

Figure 2B:
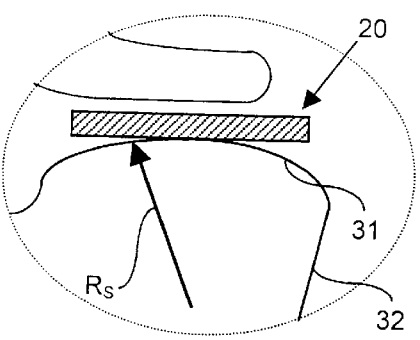

To effect tracking, the contact faces 31 of the cross elements 30 are provided with a convex curvature in a direction transverse to the longitudinal direction of the drive belt 1, as is shown in FIG. 2A. Generally, said curvature is of an essentially arc-like shape having a face radius $R_S$. In this set-up, the continuous band 20 is during operation centred on the contact face 31, and abrasive contact between the lateral sides 22, 23 of the band and the pulleys 4, 5 or the cross elements 30 is prevented to a significant extent. In FIG. 2A a transverse cross section of a drive belt 1 is shown, incorporating a cross element 30 having two side faces 32 for interaction with the sheaves of a pulley 4 or 5 and two contact faces 31 for interaction with two continuous bands 20. Part of FIG. 2A is shown enlarged as FIGS. 2B to 2F. In FIG. 2B it is visible that the contact face 31 shows a curvature having a generally arc-like shape of radius $R_S$, which curvature is located in a plane transversely oriented with respect to the longitudinal direction of the drive belt 1, whereas the continuous band 20 shows no transverse curvature and has an essentially flat transverse cross section.

Figure 2C:
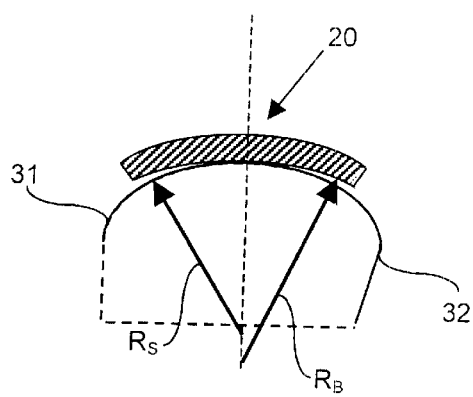
Figure 2F:
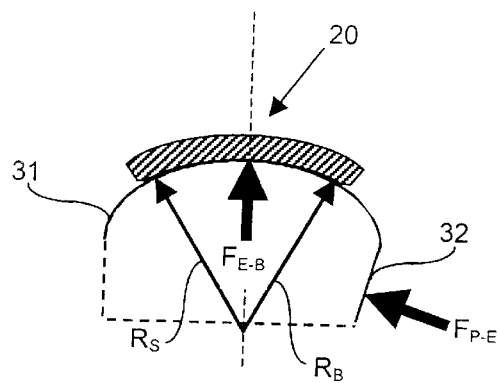
Figure 2D:
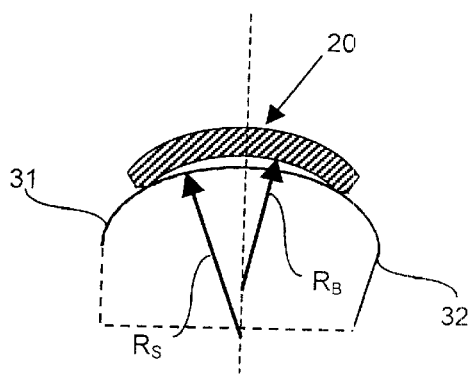
Figure 2E:
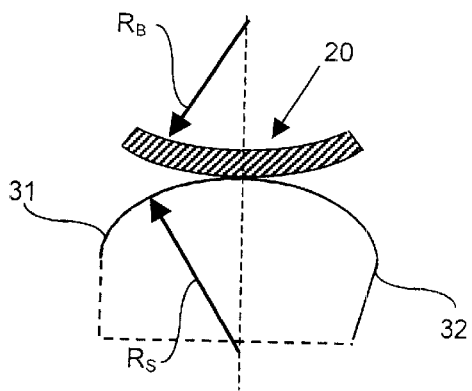

FIGS. 2C to 2E show three different orientations of the continuous band 20 with respect to the contact face 31. In FIG. 2C, the continuous band 20 shows a convex transverse curvature having a radius $R_B$ that is larger than the face radius $R_S$, i.e. the amount of transverse curvature of the band 20 is less than that of the contact face 31. In FIG. 2D, the continuous band 20 shows a convex transverse curvature having a radius $R_B$ that is smaller than the face radius $R_S$. Finally, in FIG. 2E, the continuous band 20 shows a concave transverse curvature having a radius $R_B$ that is negative with respect to the face radius $R_S$.

In FIG. 2F a drive belt 1 configuration is illustrated, wherein, due to the clamping force $F_{P-E}$ between a pulley 4 or 5 and the cross element 30, a normal force $F_{E-B}$ between the cross element 30 and the continuous band 20 is effected. Under the influence of said normal force $F_{E-B}$ the continuous band 20 is elastically deformed to fit the contact surface 31 of the cross element 31.

According to the invention both FIG. 2D and FIG. 2E represent an undesirable drive belt 1 configuration in that these configurations result in high stress levels in the continuous band 20 during operation. The situation depicted in FIG. 2D is unfavorable in that it leads to high Hertze stresses near the lateral sides 22, 23 of the continuous band, since the load, in particular the said normal force $F_{E-B}$, is carried to a significant extent by the said lateral sides 22, 23 of the band 20. The situation depicted in FIG. 2E is unfavorable in that it requires a relatively large elastic deformation of the continuous band 20 in radial sense, to fit the contact face 31 of the cross element 30. The stresses accompanying the said deformation of the band 20 will be the largest near the said lateral sides 22, 23 of the continuous band 20, since at these locations the required radial deformation is the largest. When either one or both of the configurations represented by FIGS. 2D and 2E occurs during operation of the drive belt 1 in a transmission, the load and the distribution thereof on the continuous band 20 will not be at an optimum, and the drive belt 1 may show additional wear and/or may fail prematurely, for example as a result of a fatigue crack originating from a lateral side 22, or 23 of the band 20.

FIG. 2C represents the favourable configuration of the drive belt 1 according to the invention. When, departing from this configuration the continuous band 20 is loaded by the normal force $F_{E-B}$, the load on the continuous band 20 is advantageously distributed and, in particular, does not show a significant concentration near the lateral sides 22, 23 of the band 20.

Figure 3:
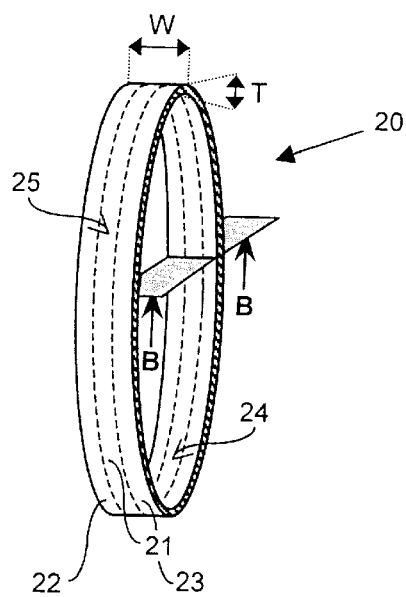
FIG. 3 is a schematic representation of a single continuous band in an unloaded state.

In FIG. 3, a single continuous band 20 is shown in an essentially arc-like configuration, i.e. in the unloaded state. Reference numeral 21 denotes a central part of the continuous band 20 that extends in longitudinal direction along its circumference. Reference numerals 22 and 23 denote the lateral sides of the continuous band 20 that are located on either side of the central portion 21. The continuous band 20 has a radially inner principle face 24 and a radially outer principle face 25. A cross section of the continuous band in this unloaded state is denoted B—B.

Figure 4:
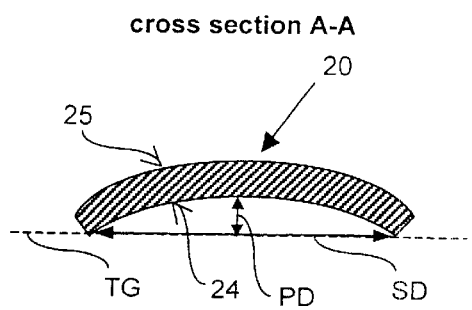
FIG. 4 represents the cross section B—B indicated in FIG. 3 and the cross sections A—A, C—C and D—D indicated in FIG. 1 and illustrates the effect of anti-clastic bending on the transverse shape of the continuous band departing from a transversely flat band in the unloaded state.
Figure 4:
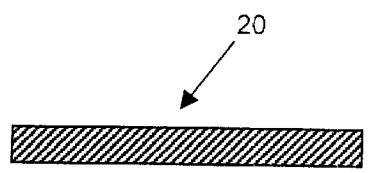
Figure 4:
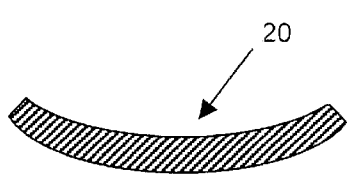
Figure 4:
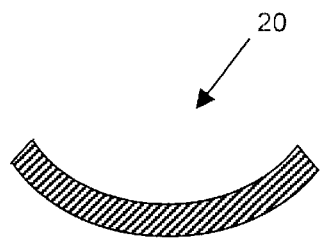
Figure 5:
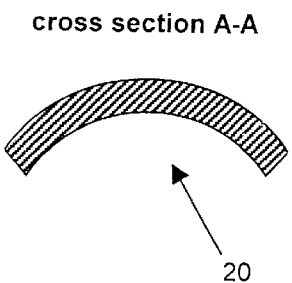
FIG. 5 represents the cross section B—B indicated in FIG. 3 and the cross sections A—A, C—C and D—D indicated in FIG. 1 and illustrates the effect of anti-clastic bending on the transverse shape of the continuous band departing from a transversely flat band in the most tightly longitudinally bent state.
Figure 5:
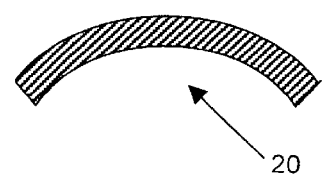
Figure 5:
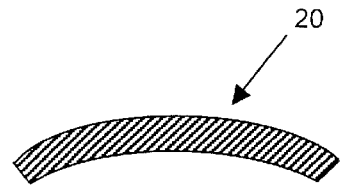
Figure 5:
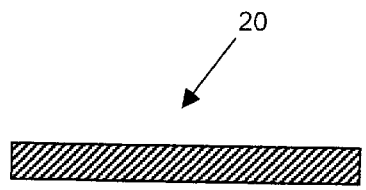

In FIGS. 4 and 5, the effect of anti-clastic bending on the transverse curvature of a continuous band 20 is shown for the said cross sections A—A, B—B, C—C and D—D. The actual amount of anti-clastic bending is highly dependent on the overall geometry of a continuous band 20 and on the amount of longitudinal bending.

In FIG. 4, it is departed from a continuous band 20 that shows no transverse curvature when in the unloaded state, which is represented by the cross section B—B. Such a band 20 will transversely curve convex when stretched in its longitudinal direction, as depicted in the cross section A—A. In dependence on the amount of bending in its longitudinal direction, the continuous band 20 will curve increasingly concave in a plane transverse to its longitudinal direction, as is depicted in the cross sections C—C and D—D respectively.

In FIG. 5, it is departed from a continuous band 20 that shows no transverse curvature when it is in the most tightly bent state, which is represented by the cross section D—D. Such a band 20 will curve increasingly bent convex in a plane transverse to its longitudinal direction, when the amount of longitudinal bending decreases, as is depicted in the cross sections C—C, B—B and A—A respectively.

FIGS. 4 and 5 illustrate the unavoidable transverse curving of the continuous band 20 in dependence on the amount of longitudinal bending of the band 20 as a result of anti-clastic bending. It may be concluded that the amount of transversely oriented convex curvature of a continuous band 20 having a convex stretched band curvature becomes less, when it is increasingly bent in its longitudinal direction. Depending on the initial amount of transversely oriented curvature of the band 20, said curvature may even become concave.

According to the invention the drive belt 1 comprises a continuous band 20 having a part, which, when in a longitudinally stretched state, as depicted in cross section A—A, shows a curvature in a direction transverse to the longitudinal direction of the drive belt 1, said curvature having a generally arc-like shape of a $R_{SB}$, the stretched band radius. The stretched band radius $R_{SB}$ is related to the radius of the transverse curvature of the contact face 31 of the cross elements 30 having a generally arc-like shape of face radius $R_S$, such that the inverse value $(1/R_S)$ of the face radius $R_S$ minus the inverse value $(1/R_{SB})$ of the stretched band radius $R_{SB}$ is notionally larger than $-5$ $[m^{-1}]$, preferably larger than $-3.5$ $[m^{-1}]$. In this manner the unfavourable contact illustrated in FIG. 2D between the lateral side 22, 23 of the continuous band 20 and the cross element 30 is advantageously prevented, at least upward from a more or less significant level of the normal force $F_{E-B}$. Furthermore, a transversely oriented concave curvature of the band 20, when it is the most tightly bent in longitudinal direction, may advantageously be avoided by adopting a relatively large transversely oriented convex band curvature in the longitudinally stretched state of the band 20. Preferably, when it is the most tightly bent, the transversely oriented convex curvature of the band 20 is virtually equal to curvature of the contact face 31, since in this case the elastic deformation of the continuous band 20 in radial sense will be virtually zero when the band 20 is the most highly loaded during operation. However, it can be necessary to adapt the amount of curvature of the cross element 30 to be able to satisfy the condition according to claim 1.

It is remarked that from the European patent application EP-A-0.950.830 another technical measure intended for prolonging service life is known. This document teaches to provide continuous bands 20, which seen in the longitudinal direction of the drive belt 1 have an essentially uniform radial thickness T and an essentially uniform axial width W, with a transversely, i.e. axially, oriented profile, such that a central part 21 of the band is somewhat thicker than parts nearer to the lateral sides 22, 23 of the band. This known technical measure may be combined with the measure according to the present invention, which has the effect that the transverse cross section will no longer be of a generally arc-like shape. According to the invention, the stretched band radius $R_{SB}$ may in such a case be approximated by the equation:

$$R_{SB} = \frac{\frac{1}{4} \cdot PD^2 + SD^2}{2 \cdot SD}$$

with SD being the length between the two points of contact of a tangent TG of the radially inner principle face (24) and PD being the largest perpendicular distance between the radially inner principle face (24) and the said tangent TG, as is illustrated in FIG. 4. This is allowed, because what is important is the amount of longitudinal bending at which contact between the central part 21 of the continuous band 20 and the cross element 30 is established.

The invention further relates to all details indicated in the following claims and figures.

What is claimed is:

1. Drive belt (1) for a transmission realising a continuously adjustable transmission ratio comprising at least one continuous band (20) having a part, which, when in a longitudinally stretched state (cross section A—A), shows a curvature in a direction transverse to the longitudinal direction of the drive belt (1), said curvature having a generally arc-like shape of radius $R_{SB}$ ("stretched band radius"), which band (20) is associated with a number of cross elements (30), each having a contact face (31) for interacting with a principal face (24) of the continuous band (20) and provided with a transverse convex curvature having a generally arc-like shape of radius $R_S$, characterised in that the inverse value $(1/R_S)$ of the face radius $R_S$ minus the inverse value $(1/R_{SB})$ of the stretched band radius $R_{SB}$ is notionally larger than $-5$.

2. Drive belt (1) according to claim 1, the continuous band (20) having a radially inner principle face (24) and a radially outer principle face (25) and being thicker in radial sense at its axial middle (21) than at either of its lateral side (22, 23) characterised in that the stretched band radius $R_{SB}$ is of a value satisfying the equation:

$$R_{SB} = \frac{\frac{1}{4} \cdot PD^2 + SD^2}{2 \cdot SD}$$

wherein:
SD is the length between the two points of contact of a tangent TG of the radially inner principle face (24);
PD is the largest perpendicular distance between the radially inner principle face (24) and said tangent TG.

3. Drive belt according to claim 2, characterized in that the said part, when in a longitudinally stretched state (cross section A—A), shows a curvature in a direction transverse to the longitudinal direction of the drive belt (1) that is equal to, or less than, the convex curvature of the contact face (31) of a cross element (30).

4. Drive belt according to claim 1, characterised in that the said part, when in a longitudinally stretched state (cross section A—A), shows a curvature in a direction transverse to the longitudinal direction of the drive belt (1) that is equal to, or less than, the convex curvature of the contact face (31) of a cross element (30).

5. Drive belt according to claim 4, characterized in that the said part, when in the most tightly longitudinally bent state (cross section D—D), shows either no curvature, or a convex curvature in a direction transverse to the longitudinal direction of the drive belt (1).

6. Drive belt according to claim 1, characterised in that the said part, when in the most tightly longitudinally bent state (cross section D—D), shows either no curvature, or a convex curvature in a direction transverse to the longitudinal direction of the drive belt (1).

7. Drive belt according to claim 6 characterised in that the said part, when in the most tightly longitudinally bent state (cross section D—D), shows a convex curvature in a direction transverse to the longitudinal direction of the drive belt (1), which is virtually equal to the convex curvature of the contact face (31) of a cross element (30).

8. The drive belt of claim 1, wherein the stretched band radius $R_{SB}$ is larger than −3.5.

9. A continuous band (20) suited for use in a drive belt (1) comprising: at least one continuous band (20) having a part, which, when in a longitudinally stretched state (cross section A—A), shows a curvature in a direction transverse to the longitudinal direction of the drive belt (1), said curvature having a generally arc-like shape of radius $R_{SB}$ ("stretched band radius"), which band (20) is associated with a number of cross elements (30), each having a contact face (31) for interacting with a principal face (24) of the continuous band (20) and provided with a transverse convex curvature having a generally arc-like shape of radius $R_S$, characterised in that the inverse value ($1/R_S$) of the face radius $R_S$ minus the inverse value ($1/R_{SB}$) of the stretched band radius $R_{SB}$ is notionally larger than −5.

10. Continuous band (20) according to claim 9, characterised in that, the band (20) has an essentially uniform radial thickness (T) and an essentially uniform axial width (W), both along its longitudinal circumference.

11. Continuous band (20), according to claim 10, characterized in that a part of the continuous band (20), which is stretched in its longitudinal direction, shows a curvature in a direction transverse to the longitudinal direction of the band (20) of a generally arc-like shape having a band radius $R_B$ having a value in the range of 50 mm to 250 mm.

12. Continuous band (20), according to claim 9, characterised in that, a part of the continuous band (20), which is stretched in its longitudinal direction, shows a curvature in a direction transverse to the longitudinal direction of the band (20) of a generally arc-like shape having a band radius $R_B$ having a value in the range from 50 to 250.

13. Continuous band (20) suited for use in a drive belt (1) according to claim 9, characterised in that the said part, when in the most tightly longitudinally bent state (cross section D—D), show either no curvature, or a convex curvature in a direction transverse to the longitudinal direction of the drive belt (1) and when in the most tightly longitudinally bent state (cross section D—D), shows a convex curvature in a direction transverse to the longitudinal direction of the drive belt (1), which is virtually equal to the convex curvature of the contact face (31) of a cross element (30).

14. A transmission, comprising:

a first pulley;

a second pulley; and a drive belt at least partly located between sheaves of the first pulley and sheaves of the second pulley and capable of transferring torque between the first and second pulley under the influence of a clamping force exerted by the sheaves of the first and second pulleys, the drive belt comprising at least one continuous band (20) having a part, which, when in a longitudinally stretched state (cross section A—A), shows a curvature in a direction transverse to the longitudinal direction of the drive belt (1), said curvature having a generally arc-like shape of radius $R_{SB}$ ("stretched band radius"), which band (20) is associated with a number of cross elements (30), each having a contact face (31) for interacting with a principal face (24) of the continuous band (20) and provided with a transverse convex curvature having a generally arc-like shape of radius $R_S$, characterized in that the inverse value ($1/R_S$) of the face radius $R_S$ minus the inverse value ($1/R_{SB}$) of the stretched band radius $R_{SB}$ is notionally larger than −5 m$^{-1}$, preferably larger that −3.5 m$^{-1}$, and the transmission having a transmission ratio continuously adjustable between an upper limit and lower limit.

* * * * *